US012582572B2

(12) United States Patent
Wegner

(10) Patent No.: US 12,582,572 B2
(45) Date of Patent: Mar. 24, 2026

(54) MASSAGE ROLLER WITH MOVABLE ARM

(71) Applicant: Paul Brett Wegner, El Segundo, CA (US)

(72) Inventor: Paul Brett Wegner, El Segundo, CA (US)

( * ) Notice: Subject to any disclaimer, the term of this patent is extended or adjusted under 35 U.S.C. 154(b) by 682 days.

(21) Appl. No.: 17/992,646

(22) Filed: Nov. 22, 2022

(65) Prior Publication Data

US 2023/0172792 A1 Jun. 8, 2023

Related U.S. Application Data

(60) Provisional application No. 63/285,215, filed on Dec. 2, 2021.

(51) Int. Cl.
*A61H 15/00* (2006.01)

(52) U.S. Cl.
CPC . *A61H 15/0092* (2013.01); *A61H 2015/0014* (2013.01); *A61H 2015/0071* (2013.01); *A61H 2201/14* (2013.01); *A61H 2201/1664* (2013.01); *A61H 2201/1695* (2013.01)

(58) Field of Classification Search
CPC ........ A61H 15/0092; A61H 2015/0014; A61H 2015/0071; A61H 2201/14; A61H 2201/1664; A61H 2201/1695
See application file for complete search history.

(56) References Cited

U.S. PATENT DOCUMENTS 1,577,924 A * 3/1926 Matchett ............ A61H 23/0254 601/103
2,273,710 A * 2/1942 Klaes ................. A61H 15/0092 601/119
3,664,334 A * 5/1972 O'Neil ............... A61H 15/0092 601/120
3,672,356 A * 6/1972 Possick .............. A61H 15/0092 601/120
D842,486 S * 3/2019 Kaoru .......................... D24/211
D845,498 S * 4/2019 Johnson ....................... D24/211
10,307,325 B1 * 6/2019 Johnson ................... A61H 1/00
10,912,705 B1 * 2/2021 Qin ........................ A61H 15/00
2010/0191161 A1 * 7/2010 Mouatt .............. A63B 21/0552 601/137
2016/0302994 A1 * 10/2016 Chen .................. A61H 23/0254
2016/0310349 A1 * 10/2016 Chen ...................... A61H 15/00
2016/0310350 A1 * 10/2016 Chen ...................... A61H 15/00
2017/0252262 A1 * 9/2017 Chang .................... A61H 15/00
2017/0319900 A1 * 11/2017 Ballo ................. A63B 21/0023
2020/0276078 A1 * 9/2020 Ploss ........................ A61H 1/00
2020/0330318 A1 * 10/2020 Chou ....................... A61H 1/00
2021/0085555 A1 * 3/2021 Davis ..................... A61H 23/00
2021/0128399 A1 * 5/2021 Wersland ............... A61H 15/00

* cited by examiner

*Primary Examiner* — Shaun R Hurley
(74) *Attorney, Agent, or Firm* — Command IP LLP; Pejman Yedidsion

(57) ABSTRACT

Systems, devices, and methods for relieving muscle pain that may include a massage roller, one or more arms at least partially disposed within the massage roller, wherein each arm of the one or more arms has a length greater than the diameter of the massage roller and slides freely across the diameter of the massage roller; and two or more movable protuberances, where each of the two or more movable protuberances is disposed at each end of each arm.

19 Claims, 16 Drawing Sheets

MASSAGE ROLLER WITH MOVABLE ARM

CROSS-REFERENCE TO RELATED APPLICATIONS

This application claims priority to and the benefit of U.S. Provisional Patent Application No. 63/285,215, filed Dec. 2, 2021, the contents of which are hereby incorporated by reference herein for all purposes.

TECHNICAL FIELD

Embodiments relate generally to massage rollers, and more particularly to massage rollers with movable elements.

BACKGROUND

Trigger point are sensitive areas of tight muscles formed from either injuries or overuse. Muscle pain is often the result of these trigger points that have developed from repetitive movements. To relieve pain caused by the trigger points, pressure may be applied to the trigger point to relieve tension. One way of targeting these trigger points is by using a massage roller.

SUMMARY

A system embodiment may include: a massage roller, a set of arms where each arm has a length greater than the diameter of the massage roller and slides freely across the diameter of the massage roller, and a set of movable protuberances where each movable protuberance is positioned at an end of each arm.

A system embodiment may include: a massage roller; one or more arms at least partially disposed within the massage roller, where each arm of the one or more arms has a length greater than the diameter of the massage roller and slides freely across the diameter of the massage roller; and two or more movable protuberances, where each of the two or more movable protuberances may be disposed at each end of each arm.

In additional system embodiments, each movable protuberance may be sized to prevent a corresponding arm from completely exiting the massage roller. In additional system embodiments, the system may further include: one or more static protuberances disposed on the exterior of the massage roller. In additional system embodiments, each arm has a fixed length. In additional system embodiments, each arm may be made of a rigid material.

In additional system embodiments, the massage roller has a solid core. In additional system embodiments, at least one of the one or more movable protuberances has defined sides. In additional system embodiments, at least one of the one or more movable protuberances has a dome shape.

Additional system embodiments may include: a vibration mechanism configured to vibrate the two or more moveable protuberances. In additional system embodiments, at least a subset of the two or more movable protuberances may be configured to be in alternating positions. In additional system embodiments, at least a subset of the two or more movable protuberances may be configured to move simultaneously.

Another system embodiment may include: a massage roller; one or more static protuberances disposed on an outer surface of the massage roller; one or more arms at least partially disposed within the massage roller; and one or more movable protuberances, where each of the one or more movable protuberances may be disposed at an end of each arm of the one or more arms; where each of the one or more moveable protuberances may be moveable between a first elevated position elevated above the outer surface of the massage roller and a second sunken position substantially level with one or more static protuberances.

Additional system embodiments may further include: a resilient element configured to extend the one or more moveable protuberances to the first elevated position. In additional system embodiments, the massage roller has a solid core. Additional system embodiments may include: a vibration mechanism configured to vibrate the two or more moveable protuberances. In additional system embodiments, at least a subset of the two or more movable protuberances may be configured to be in alternating positions. In additional system embodiments, at least a subset of the two or more movable protuberances may be configured to move simultaneously. In additional system embodiments, each arm of the one or more arms may be a piston, and where each arm further comprises: a first piston member; and a second piston member configured to receive the first piston member.

A method embodiment may include: providing a massage roller with one or more moveable protuberances connected to one or more corresponding moveable arms and one or more static protuberances; rolling on top of the massage roller; extending a moveable protuberance of the one or more moveable protuberances above an outer surface of the massage roller to an elevated position; and retracting the moveable protuberance to a second sunken position as pressure may be applied to the moveable protuberance. Additional method embodiments may include: extending the moveable protuberance to the elevated position as pressure may be removed from the moveable protuberance.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The present system allows for the relieving of tension at trigger points through movable elements on a massage roller. The movable elements on the massage roller may provide additional pressure in comparison to the static elements on the massage roller. The additional pressure provided by the movable elements may provide a greater reduction in muscle tension at the targeted trigger points.

Figure 1:
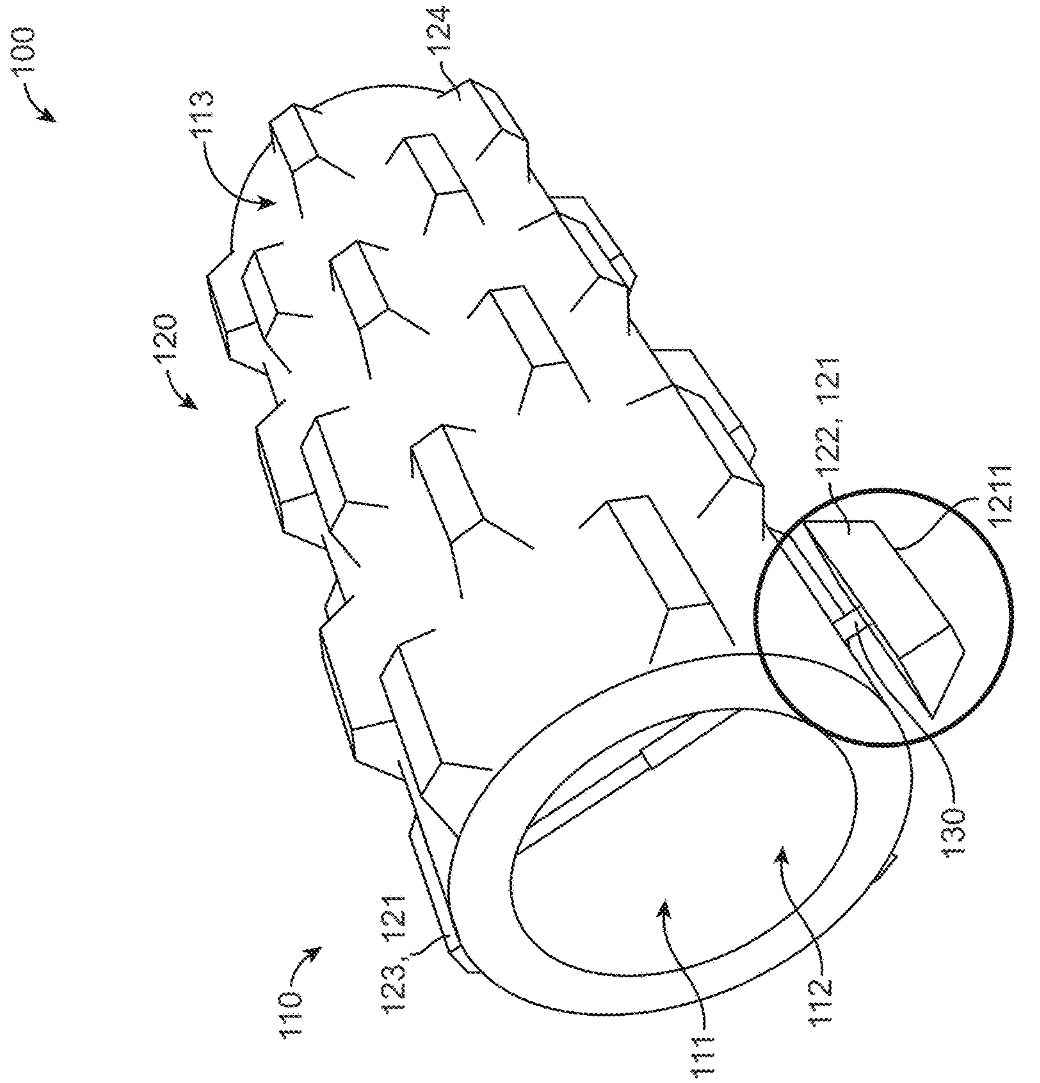
FIG. 1 depicts a system for relieving muscle pain having a massage roller with movable elements, according to an embodiment of the disclosure.

FIG. 1 depicts a system 100 for relieving muscle pain having a massage roller 110 with a set of protuberances 120 disposed near the outer surface 113 of the massage roller 110. In some embodiments, the massage roller 110 may be made of foam. In some embodiments, the massage roller 110 may be made of hard plastic. The set of protuberances 120 may include a set of movable protuberances 121 and may further include a set of static protuberances 124 disposed on the outer surface 113.

In some embodiments, the set of static protuberances 124 and the set of movable protuberances 121 are identical in shape and/or material construction. In some embodiments, the set of static protuberances 124 and the set of movable protuberances 121 are different in shape and/or material construction. In some embodiments, the set of static protuberances and the set of movable protuberances may alternate in position across the massage roller 110. In some embodiments, the static 124 and/or moveable 121 protuberances may be distinguished by color or texture so that a user can easily tell which ones can be moved and which one are static. In some embodiments, the surface is solid and the protuberances 121, 124 only protrude through the surface and may not be separate pieces.

Each movable protuberance 121 may be disposed at an end of a corresponding arm 130 of a set of arms. In one embodiment, each arm 130 may have two movable protuberances 121 disposed at opposing ends. Each corresponding arm 130 may be longer than the diameter of the massage roller 110 and freely slide across the diameter of the massage roller 110. Each movable protuberance 121 may be further configured to prevent the corresponding arm 130 from completely exiting the massage roller 110. For example, each movable protuberance 121 may be sized to prevent the corresponding arm 130 from completely exiting the massage roller 110.

Each movable protuberance 121 may be configured to be at a first elevated position such that the corresponding arm 130 may visibly extend through the outer surface 113. Each movable protuberance 121 may be configured to be at a second sunken position where the movable protuberance 121 is substantially level with the set of static protuberances 124.

The massage roller 110 may further include an internal cavity 111 and a set of roller outlets (not shown) that extend through both inner surface 112 and the outer surface 113 and each arm 130 may be received by at least one roller outlet. In some embodiments, the internal cavity 111 may be covered by an end cap. The end cap may be fixed or detachably attached. In other embodiments, the internal cavity 111 may be open. Each arm 130 may be repositioned by accessing the arm 130 through the internal cavity 111 and moving an arm 130 into a different position. In some embodiments, the inner surface 112 and the outer surface 113 may have different material constructions. For example, the inner surface 112 may be made of a hard plastic while the outer surface may be made of a softer rubber.

In one embodiment, the movable protuberances 121 may provide greater pressure by transferring force directly across the arm 130. Continuing with this embodiment, each arm 130 may have a fixed length that is longer than the diameter of the massage roller 110 and may be made of a rigid material. The arm 130 may be made from any type of materials that are rigid or have flexibility. Each arm 130 may be configured to be received by the set of roller outlets (not shown) such that each arm 130 may freely slide through the diameter of the massage roller 110. Each arm 130 may include a first movable protuberance 122 disposed at one end of the arm 130 and a second movable protuberance 123 disposed at an opposing end of the arm 130.

Both the first movable protuberance 122 and the second movable protuberance 123 may have a polygonal shape with defined sides 1211. The defined sides 1211 of the first movable protuberance 122 and the second movable protuberance 123 provides an advantage by temporarily slidably locking either movable protuberance 122, 123 against a surface while the massage roller 110 is being rotated, thus allowing force to be transferred directly through the arm 130 instead of being dispersed through the outer surface 113. The direct transfer of force through the arm 130 provides greater pressure to a trigger point of a user than the set of static protuberances 124. The protuberances 121, 122, 123, 124 are not limited to any shape, surface, or size and alternate shapes, surfaces, and/or sizes are possible and contemplated.

Figure 2:
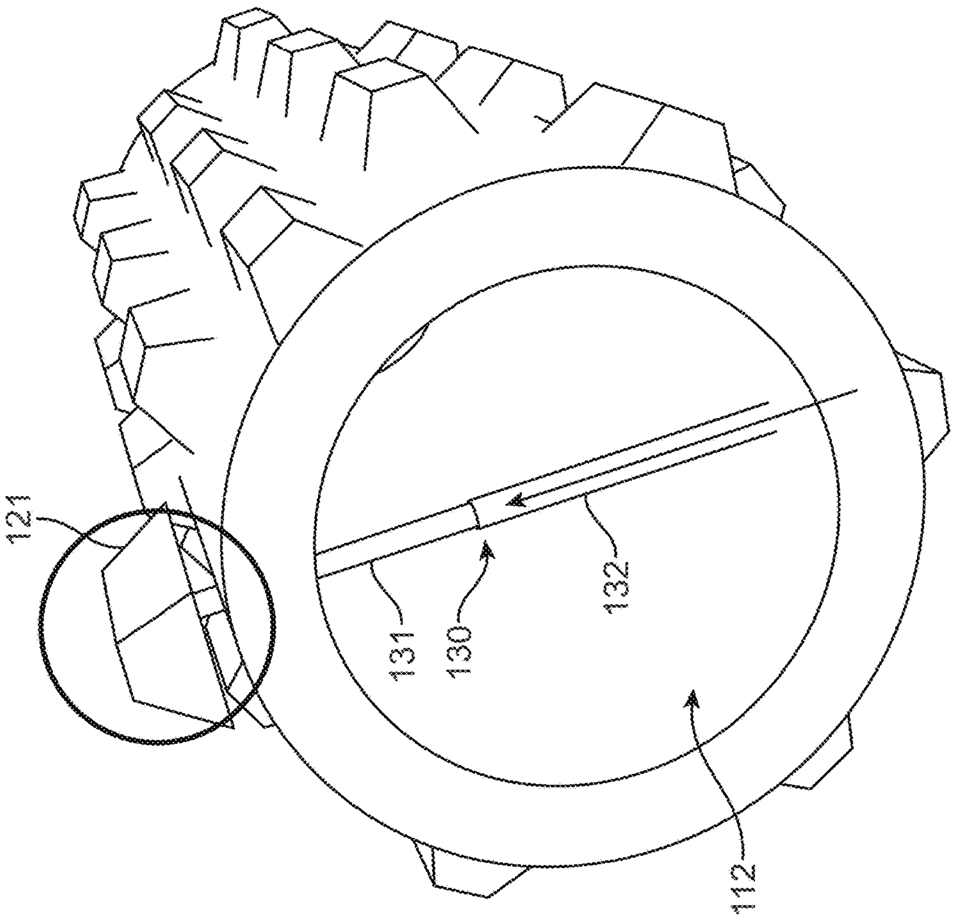
FIG. 2 depicts a front-left perspective of the massage roller of the present system, according to an embodiment of the disclosure.

Referring to FIG. 2, in one embodiment, each arm 130 may be a piston and may include a single movable protuberance 121 to provide a middle ground between the previous embodiment and a set of static protuberances. Continuing with this embodiment, each arm 130 may include a first piston member 131 and a second piston member 132 receiving the first piston member 131. A movable protuberance 121 may be disposed at a free end of the first piston member 131 while the free end of the second piston member may be fixed to the inner surface 112. The first piston member 131 and the second piston member 132 may be reduce the force that is directly transferred through the arm 130 to provide a middle ground between the previous embodiment having an arm at a fixed length and a set of static protuberances.

In some embodiments, each arm 130 may include a piston and the massage roller may include one or more static protuberances and one or more movable protuberances 121. In some embodiments, the piston 131 may retract when force is applied to the moveable protuberance 121. In one embodiment, the piston 131 may be a solid member which does not retract when force is applied to the moveable protuberance 121. In one embodiment, the roller portion may be made out of a mold with the cylinders as part of the mold not a second added piece. In another embodiment, a rod with pistons may be added to an existing piece made from a mold. The embodiments of FIG. 1 and FIG. 2 may be combined in some embodiments to have both arms 130 with pistons and fixed arms (130, FIG. 1).

Figure 3:
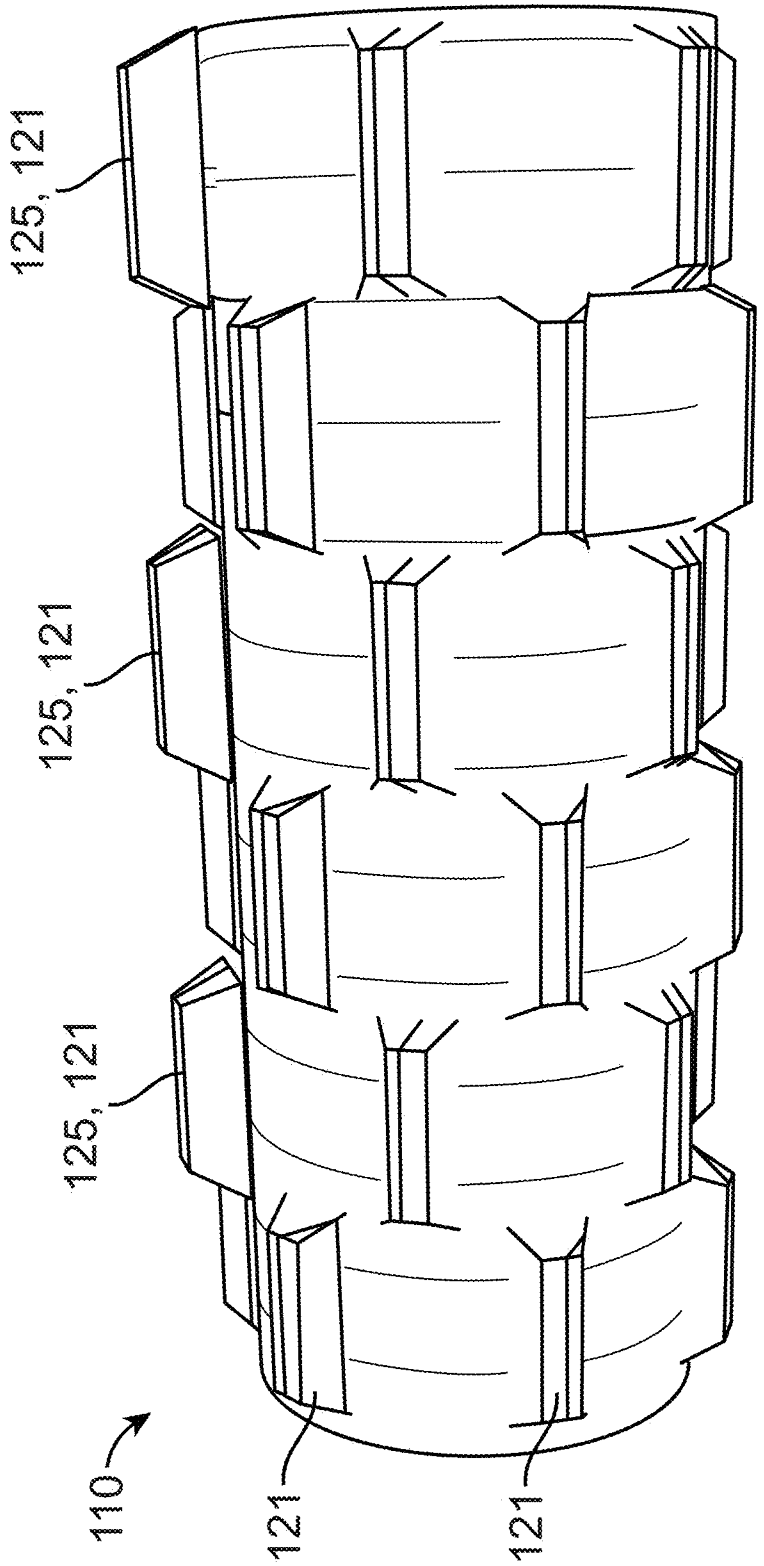
FIG. 3 depicts the massage roller having the movable elements in an elevated position, according to an embodiment of the disclosure.
Figure 4:
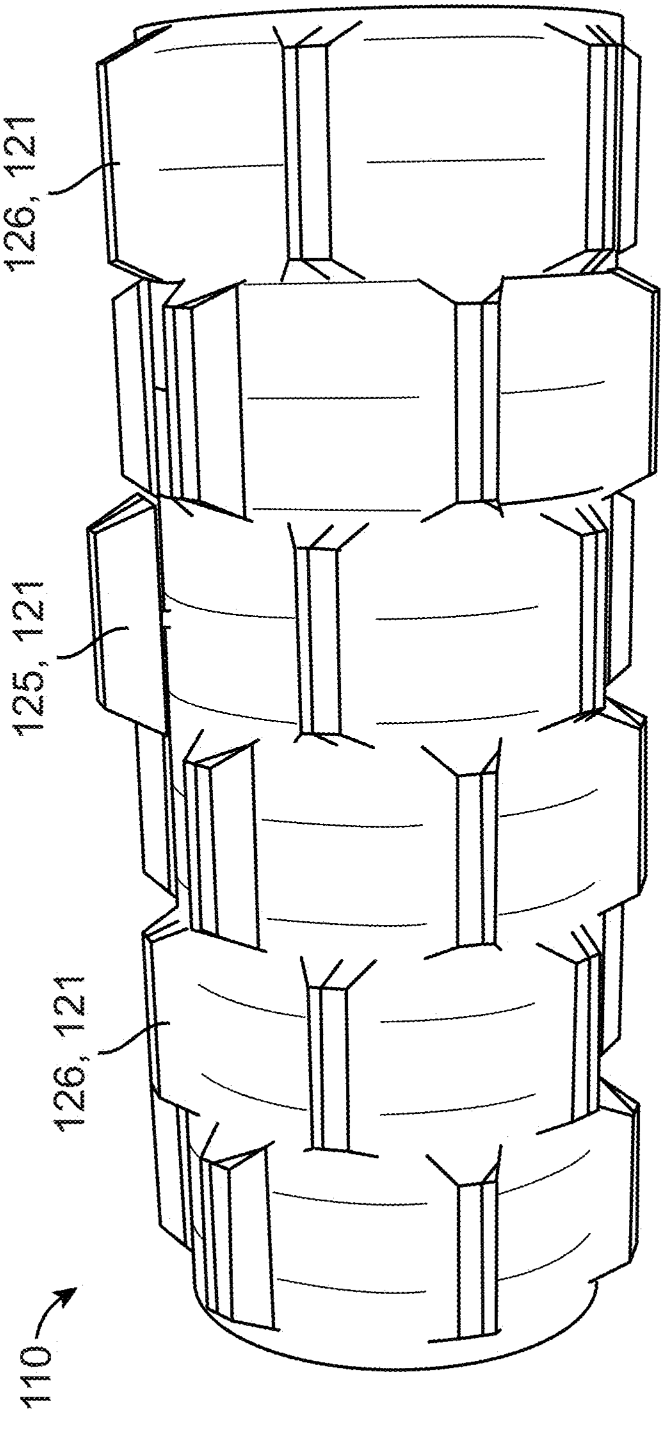
FIG. 4 depicts the massage roller having a group of movable elements in a sunken position and a movable element in an elevated position, according to an embodiment of the disclosure.
Figure 5:
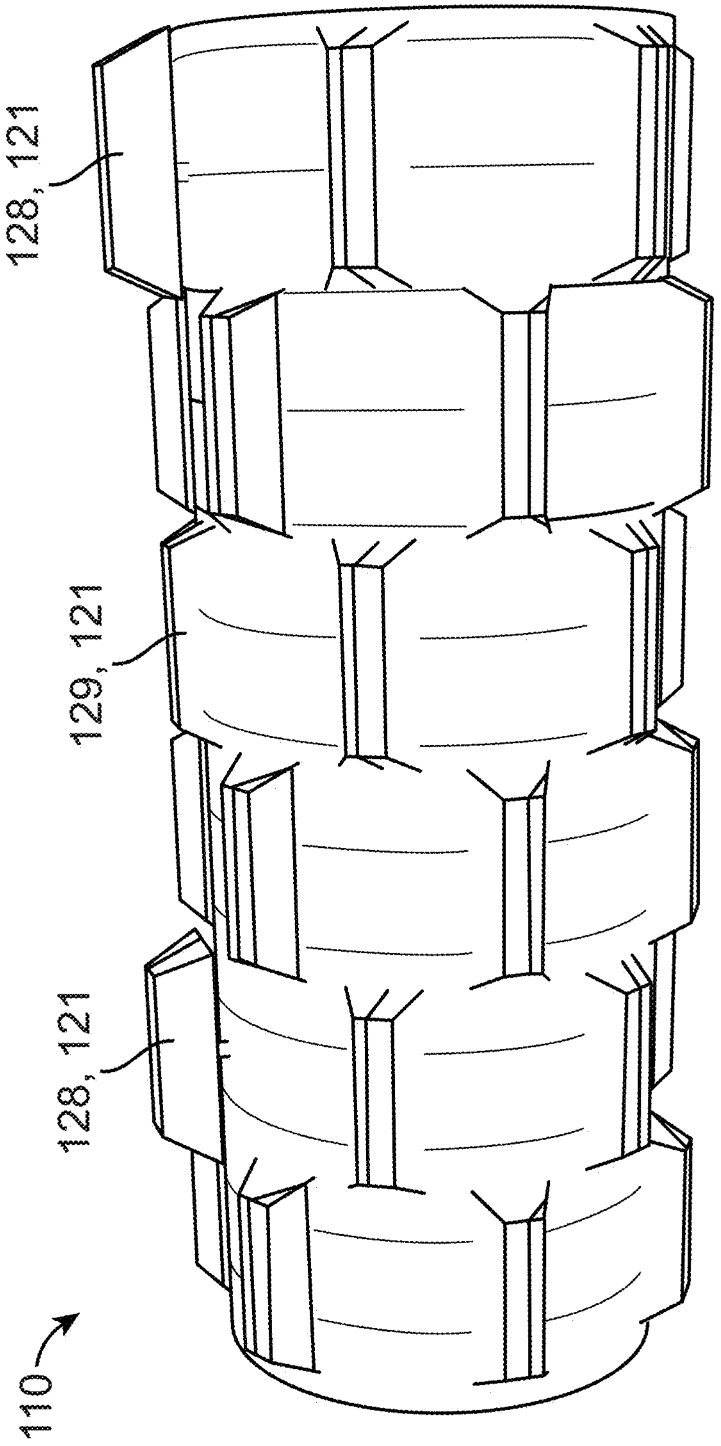
FIG. 5 depicts the massage roller having a group of movable elements in an elevated position and a movable element in a sunken position, according to an embodiment of the disclosure.

FIGS. 3-5 depict different configurations for the set of movable protuberances 121, according to some embodiments. The set of movable protuberances 121 may be positioned for any possible combination and the individual position of each movable protuberance 121 may be configured based on personal preference. In some embodiments, a lever may be used to configure the position of the set of movable protuberances 121.

Referring to FIG. 3, in some embodiments, the set of movable protuberances 121 may be configured such that a subset of movable protuberances 125 may move together. For example, the subset of movable protuberances 125 may be a row of movable protuberances that move together. In some embodiments, the protuberances may move based on the amount of force applied on the other side of the protuberance. In some embodiments, adjusting a position of one of the moveable protuberances 121 may adjust the position of the entire subset of moveable protuberances 125.

Referring to FIG. 4, in some embodiments, the set of movable protuberances 121 may be configured such that only one movable protuberance may be repositioned at a time. For example, a free movable protuberance 125 may be able to move while the other movable protuberances 126 may be temporarily fixed at a position. In one embodiment, the pistons engaged may be the ones that have pressure applied by force and/or by mechanics.

Referring to FIG. 5, in some embodiments, the set of movable protuberances 121 may be configured such that some of the movable protuberances are in alternating positions. For example, the set of movable protuberances 121 may include a first alternating subset of movable protuberances 128 and a second alternating subset of movable protuberances 129 that may alternate positions with the first alternating subset of movable protuberances 128. In some embodiments, levers may be attached between the first alternating subset of movable protuberances 128 and the second alternating subset of movable protuberances 129 to regulate the movement of the movable protuberances.

Figure 6:
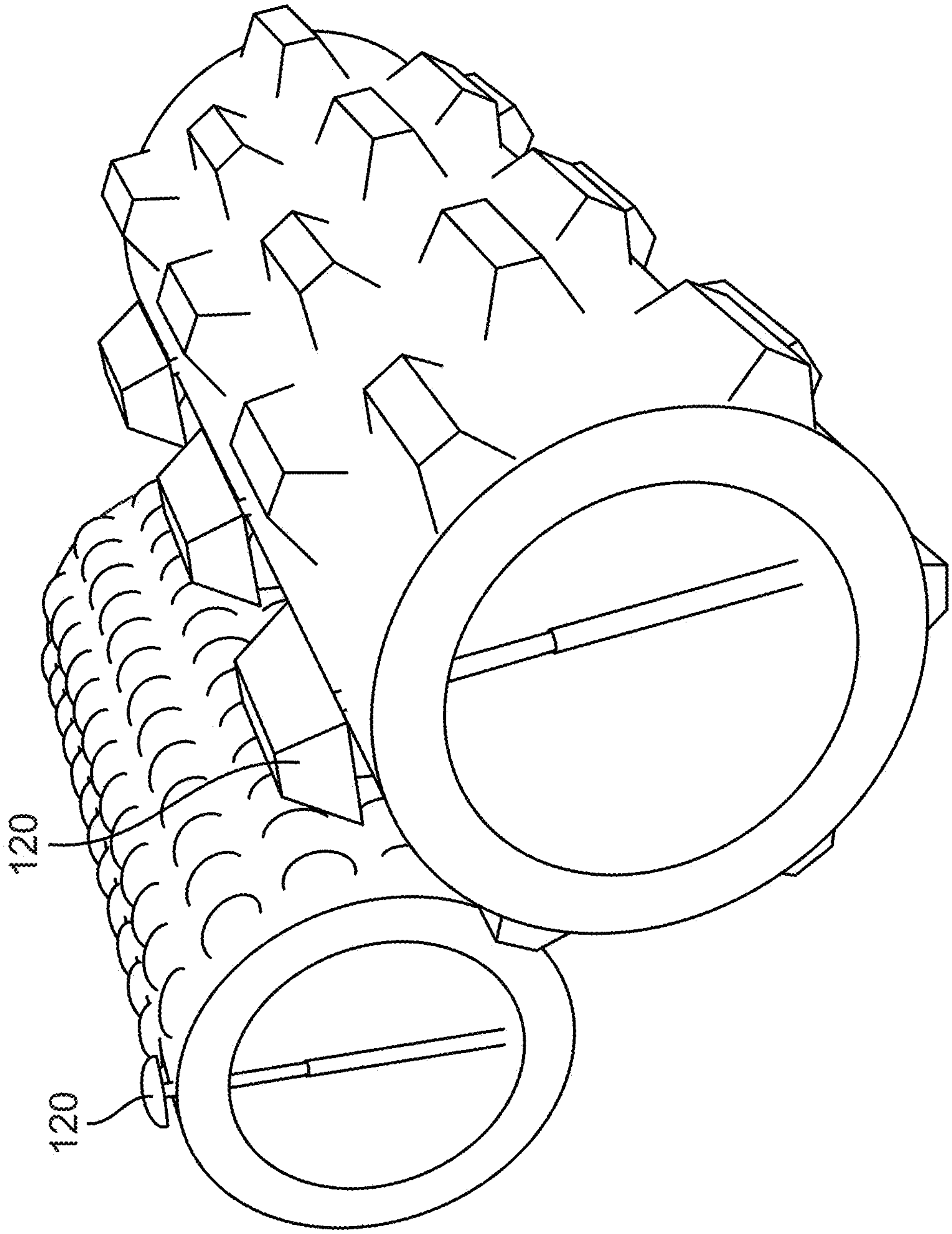
FIG. 6 depicts alternative embodiments for the movable elements.

FIG. 6 depicts alternative embodiments for the set of protuberances 120. For example, each protuberance 120 may have a dome shape instead of a polygonal shape. In other embodiments, the protuberances 120 do not share the same shape. In other embodiments, the protuberances 120 may be made of the same material such as a hard plastic. In other embodiments, the protuberances 120 may not share the same material construction. In other embodiments, the protuberances 120 may include small fists and/or have rounded ends.

Figure 7A:
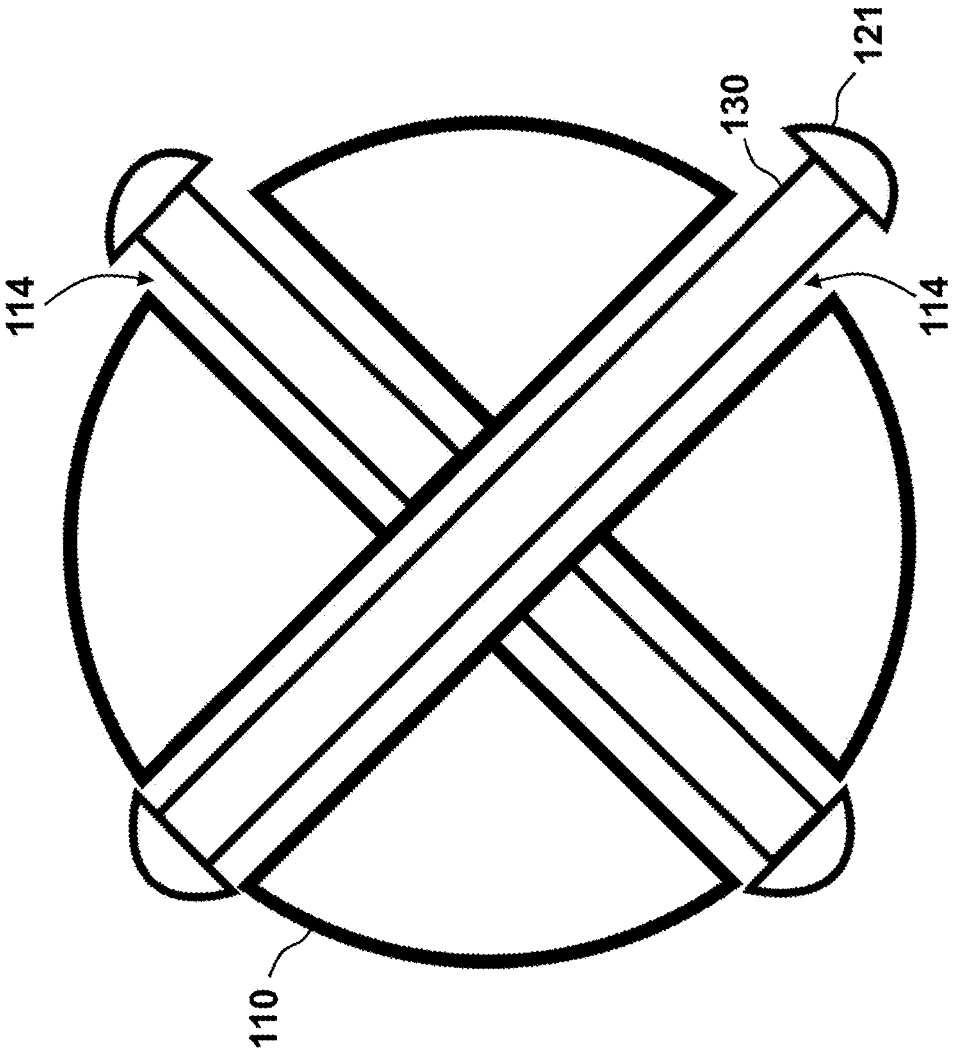
FIG. 7A depicts a cut-away view of a massage roller having a solid core, according to an embodiment of the disclosure.

FIG. 7A depicts a cut-away view of an alternative embodiment with a massage roller having a solid core. Continuing with this embodiment, the massage roller 110 may have a set of channels 114 instead of a set of roller outlets. Each end of a channel 114 may exit opposing sides of the exterior of the massage roller 110. For example, a channel 114 may have a length shorter than the diameter of massage roller 110 and may stretch across a portion of the massage roller 110. The set of arms 130 may move freely within the set of channels 114 to reposition any attached movable protuberances 121 as needed. In one embodiment, a movable protuberance may have a vibration mechanism (800, FIG. 8). The vibration mechanism may vibrate the movable protuberance to better relieve tension at trigger points. The vibration mechanism may be powered by rechargeable batteries stored in either the movable protuberance or the corresponding arm. In one embodiment, the vibration mechanism may be located inside the massage roller. The only pieces affected may be the pistons and the protuberances. The vibration mechanism may be battery powered and/or have a cord normal power supply.

Figure 7B:
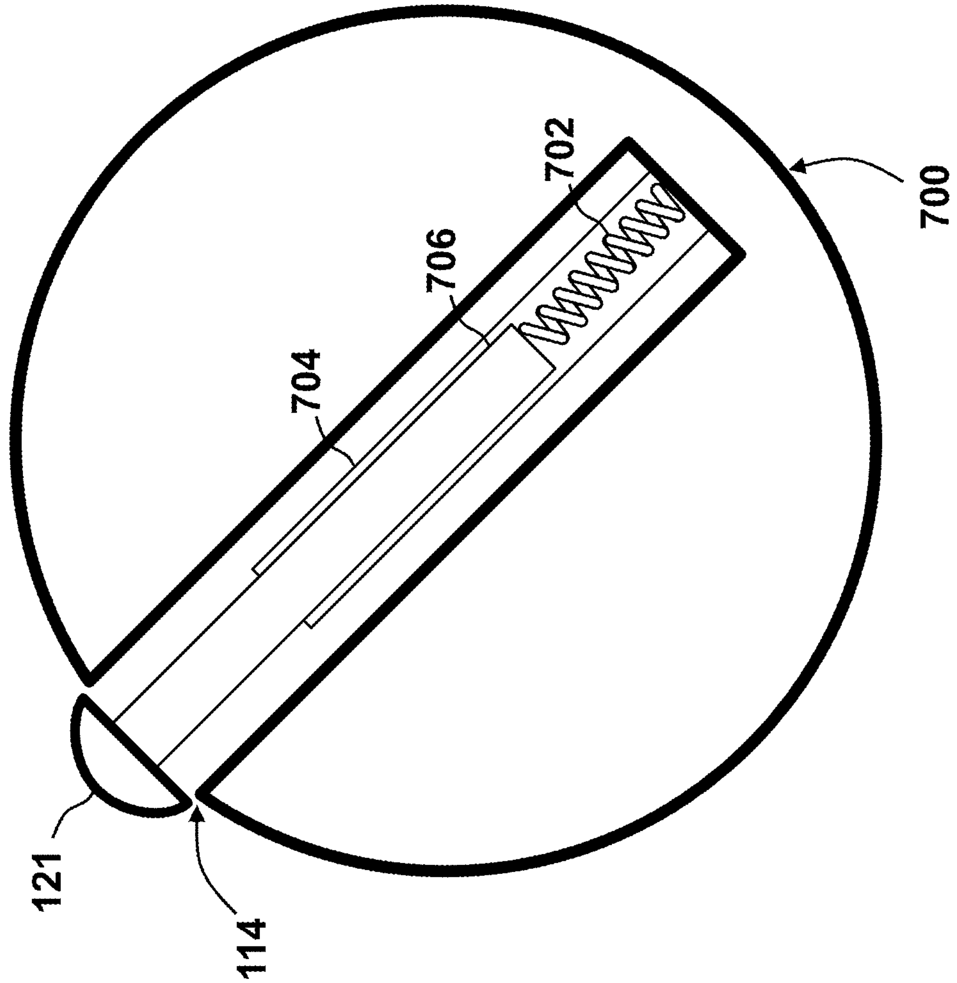
FIG. 7B depicts a cut-away view of a massage roller having a moveable element loaded by a resilient element.

FIG. 7B depicts a cut-away view of a massage roller 700 having a moveable protuberance 121 loaded by a resilient element 702. The moveable protuberance 121 may extend through a channel 114 and include an arm made from a first portion 704 and a second portion 706. The second portion 706 may extend into the first portion 704 and be loaded via a resilient element 702, such as a spring. The resilient element 702 may elevate the moveable protuberance 121 above an outer surface of the massage roller 700. When a user applies pressure to the moveable protuberance 121, the resilient element 702 may resist this applied pressure and provide additional pressure to a trigger point of the user.

Figure 8:
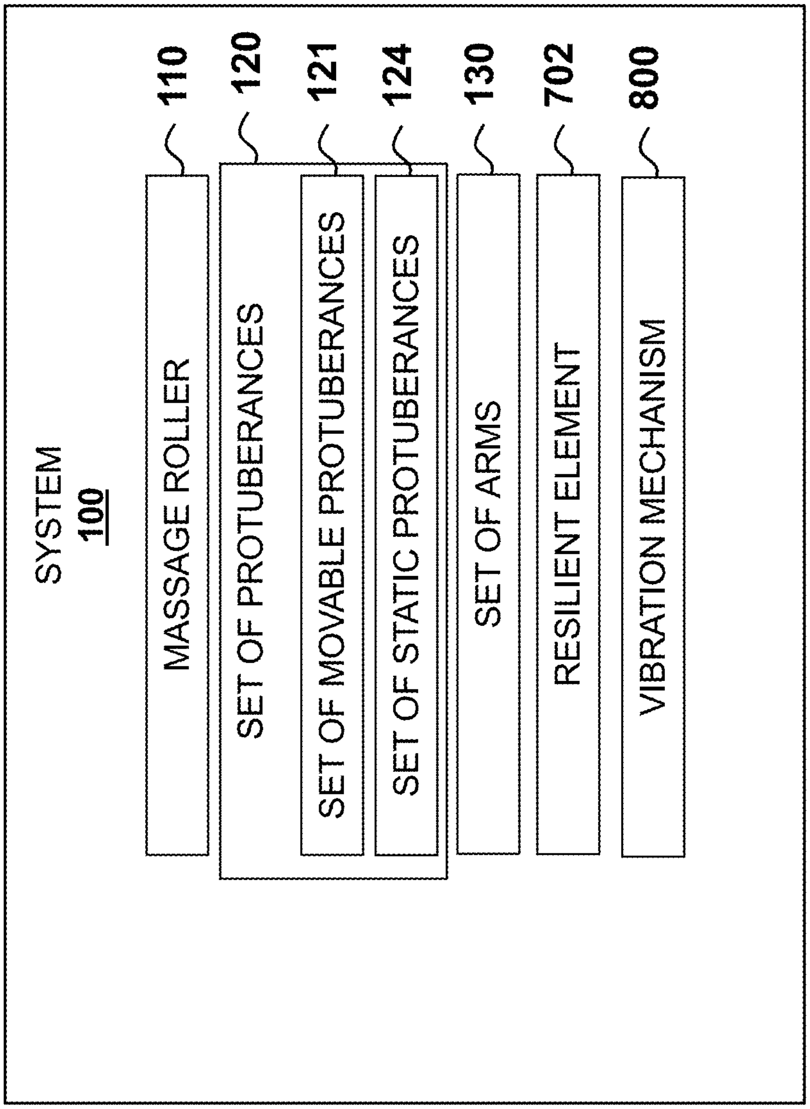
FIG. 8 depicts a high-level block diagram of the present system, according to an embodiment of the present disclosure.

FIG. 8 depicts a high-level block diagram of the present system 100. The present system 100 may include a massage roller 110, a set of protuberances 120, and a set of arms 130 positioned within the massage roller 110. The set of protuberances 120 may include a set of movable protuberances 121 and a set of static protuberances 124. At least one member of the set of movable protuberances 121 may be disposed on a free end of a member of the set of arms 130. The set of movable protuberances 121 may be able to move by having the corresponding member of the set of arms 130 move freely within the massage roller or by being attached to a member of the set of arms 130 with a piston mechanism. A vibration mechanism 800 may vibrate the movable protuberance and/or the massage roller 110 to better relieve tension at trigger points.

Figure 9:
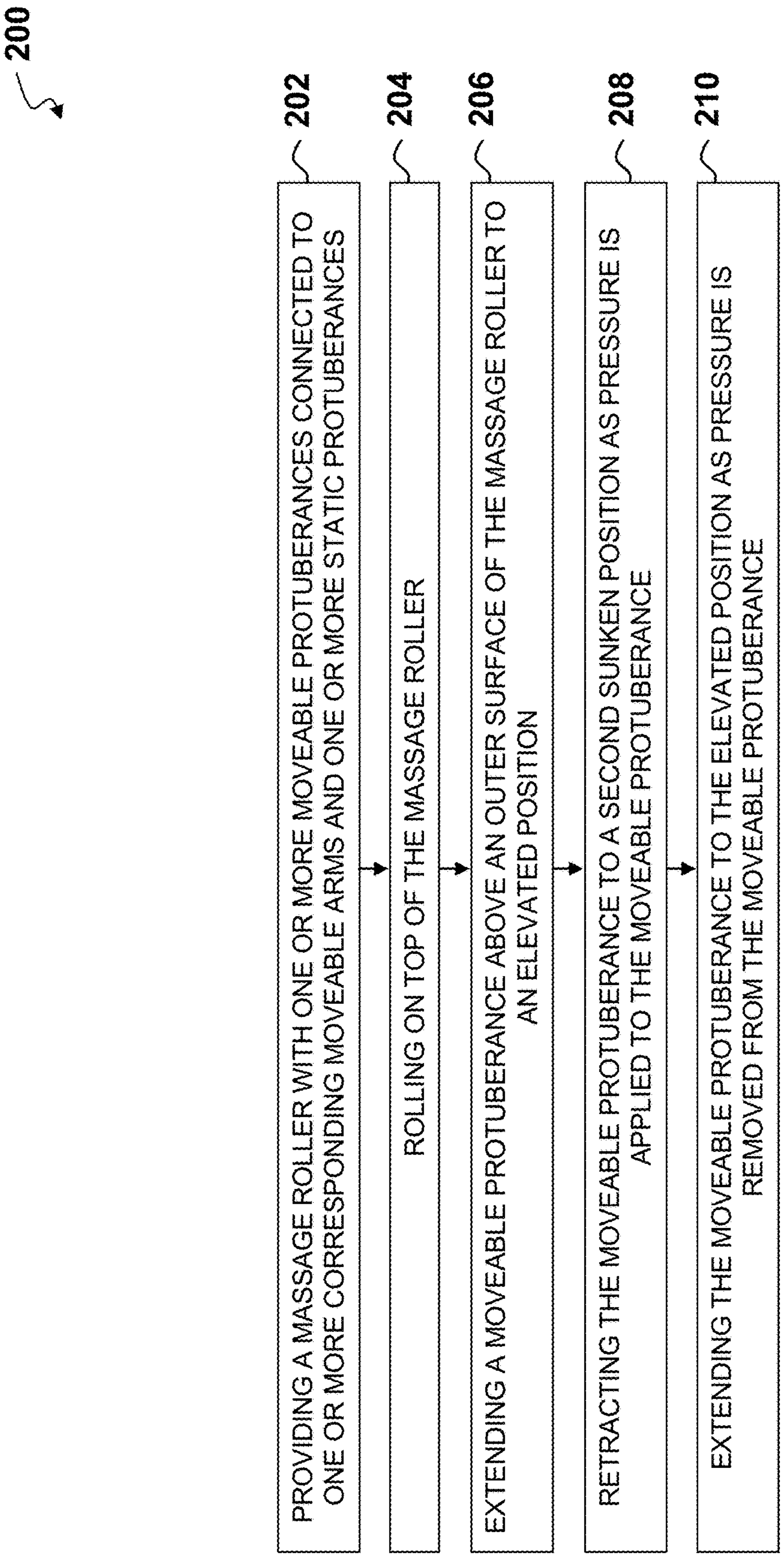
FIG. 9 depicts a method embodiment, according to an embodiment of the present disclosure.

FIG. 9 depicts a method 200 for relieving muscle pain. The method 200 may include providing a massage roller with one or more moveable protuberances connected to one or more corresponding moveable arms and one or more static protuberances (step 202). The method 200 may then include rolling on top of the massage roller (step 204). The method 200 may then include extending a moveable protuberance above an outer surface of the massage roller to an elevated position (step 206). The moveable protuberance may be extended to the elevated position by exerting a force on a first moveable protuberance disposed at an opposite end of a second moveable protuberance extended to the elevated position. This exerted force may be by pressing the first moveable protuberance against a surface, such as by rolling the massage roller so that the first moveable protuberance contacts the surface. The first moveable protuberance and the second moveable protuberance may be connected by an arm (130, FIG. 1) having a length longer than a diameter of the massage roller. In other embodiments, the moveable protuberance extended to the elevated position may be attached to an arm having a piston (FIG. 2) and/or a resilient element (FIG. 7B).

The method 200 may then include retracting the moveable protuberance to a second sunken position as pressure is applied to the moveable protuberance (step 208). The applied pressure may be via a trigger point of a user. The applied pressure may be via contact with a surface as the massage roller is rolled so that the moveable protuberance contacts the surface during movement of the massage roller.

The method 200 may then include extending the moveable protuberance to the elevated position as pressure is removed from the moveable protuberance (step 210). The moveable protuberance may be extended by exerting a force on the first moveable protuberance disposed at an opposite end of the second moveable protuberance extended to the elevated position. This exerted force may be by pressing the first moveable protuberance against a surface, such as by rolling the massage roller so that the first moveable protuberance contacts the surface. In other embodiments, the moveable protuberance may be extended via an arm having a piston (FIG. 2) and/or a resilient element (FIG. 7B).

Figure 10:
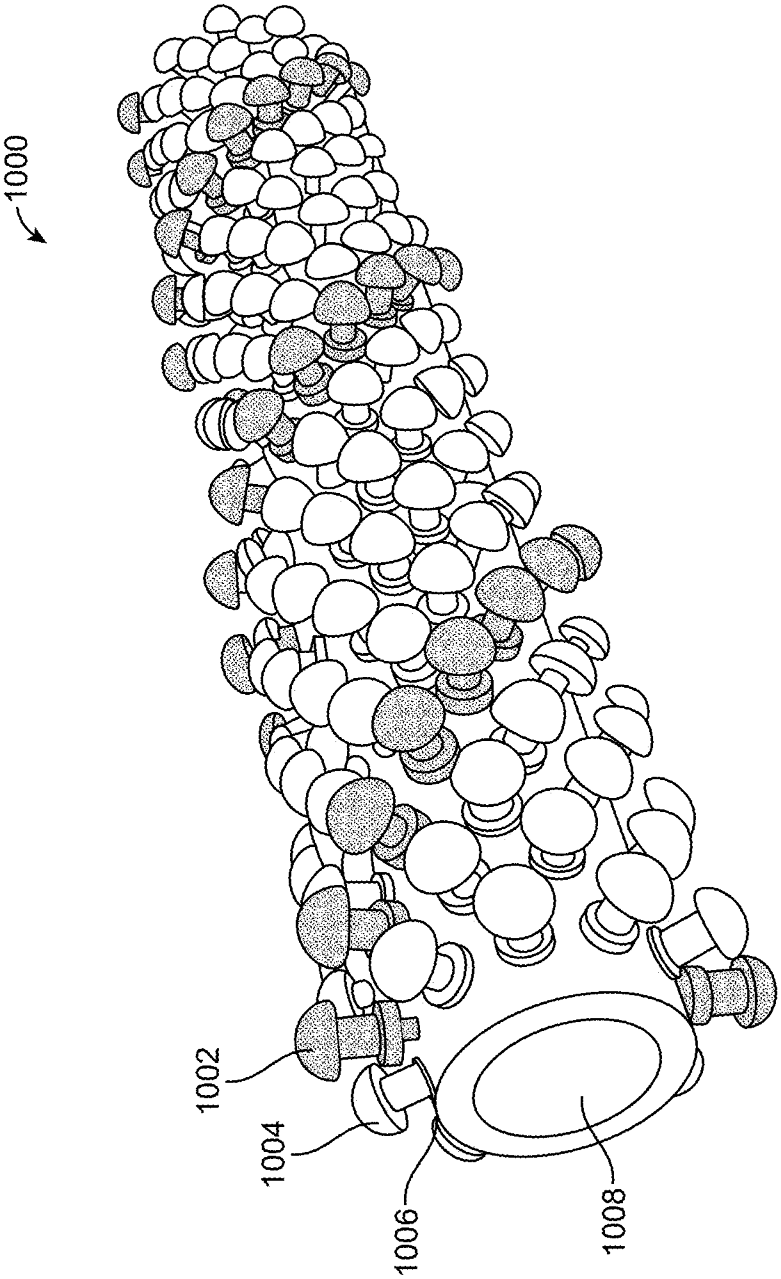
FIG. 10 depicts a perspective view of an alternate massage roller with movable elements, according to an embodiment of the disclosure.

FIG. 10 depicts a perspective view of an alternate massage roller 1000 with movable elements. The massage roller 1000 may have one or more moveable protuberances 1002 and one or more fixed protuberances 1004. The one or more moveable protuberances 1002 may be elevated above an outer surface 1006 of the massage roller 1000 when a corresponding moveable protuberance is in contact with the outer surface 1006 of the massage roller 1000. An internal cavity 1008 may contain one or more arms (1010, FIG. 12).

Figure 11:
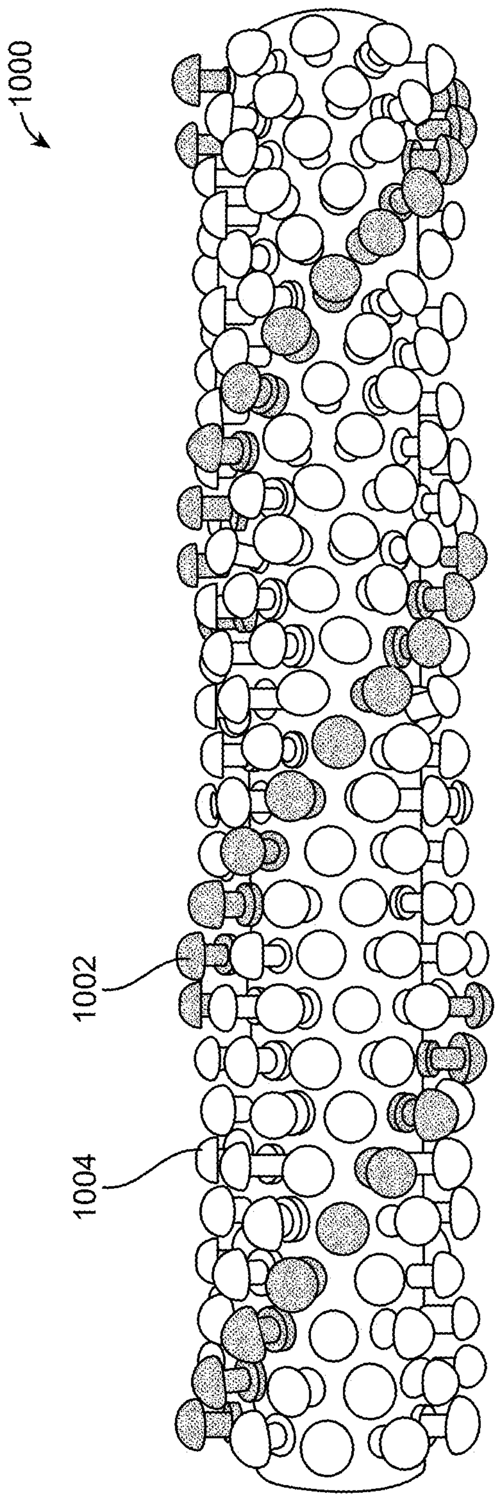
FIG. 11 depicts a front view of the massage roller of FIG. 10.

FIG. 11 depicts a front view of the massage roller 1000 of FIG. 10. In some embodiments, the location of the one or more moveable protuberances 1002 may be arranged in a pattern relative to the one or more fixed protuberances 1004, such as a helix pattern. Other patterns and/or arrangements are possible and contemplated.

Figure 12:
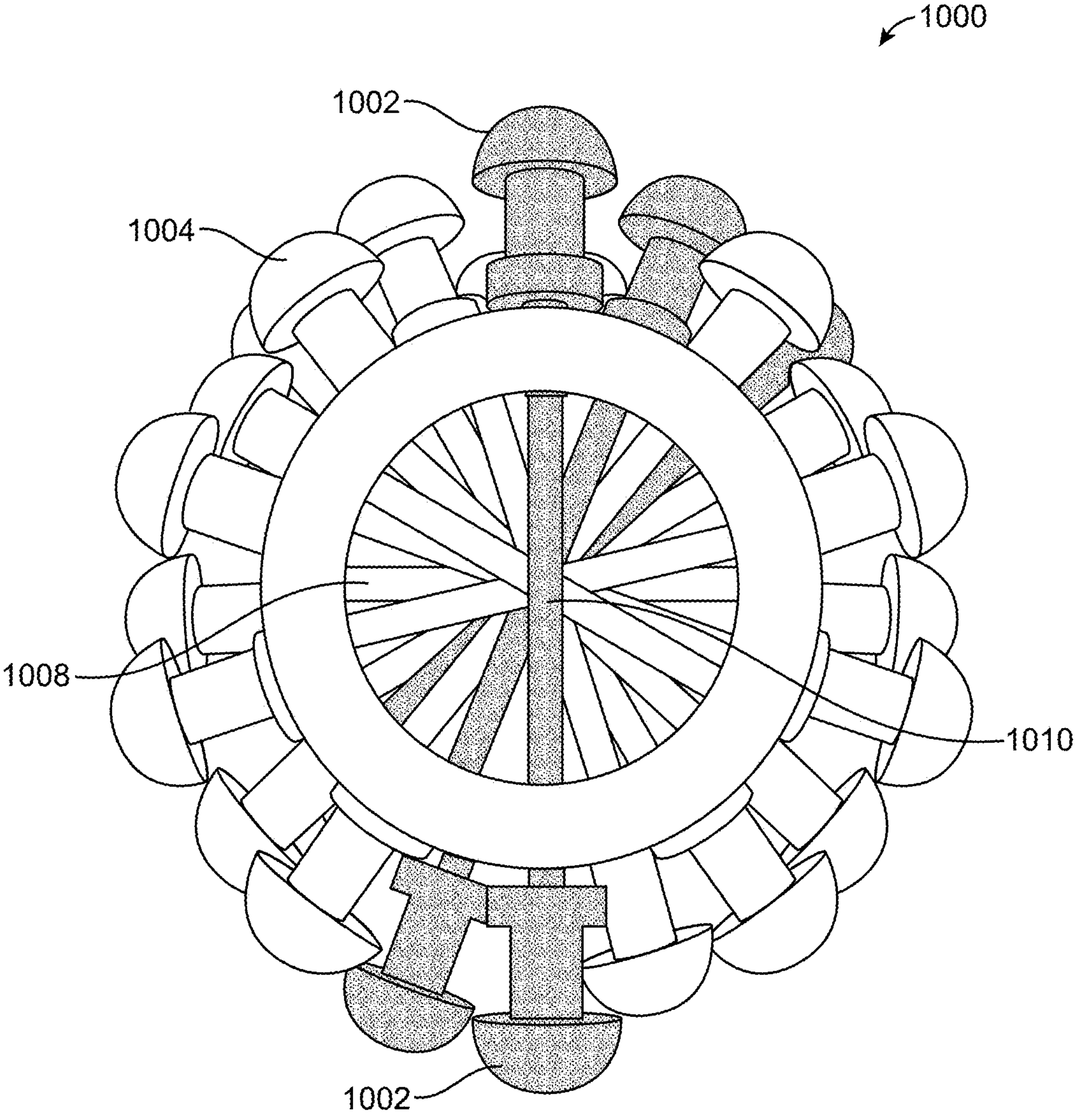
FIG. 12 depicts a left side view of the massage roller of FIG. 10.

FIG. 12 depicts a left side view of the massage roller 1000 of FIG. 10. The internal cavity 1008 may contain one or more arms 1010. A moveable protuberance 1002 may be disposed on each end of each arm 1010 such that a moveable protuberance 1002 may be elevated above the outer surface of the massage roller 1000 when a corresponding moveable protuberance 1002 is in contact with the outer surface of the massage roller. The dimensions of the one or more fixed protuberances 1004 may be such that a proximate moveable protuberance 1002 in a first elevated position is elevated above the fixed protuberance 1004 and the elevated moveable protuberance 1002 will contact a surface causing the moveable protuberance 1002 to move to a second sunken position. The fixed protuberance 1004 and the moveable protuberance in a second sunken position 1002 may have the same dimensions and/or elevation above the outer surface of the massage roller 1000.

Figure 13:
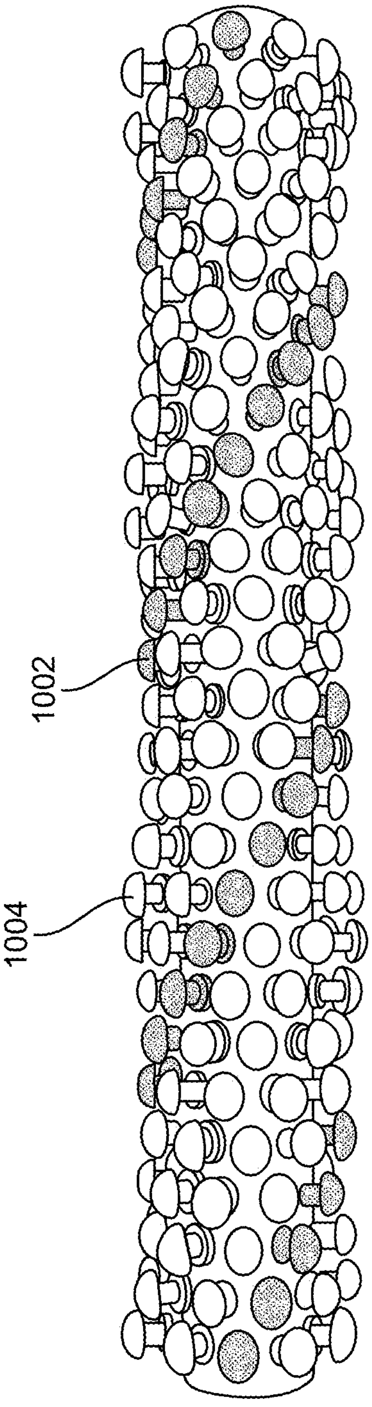
FIG. 13 depicts a top view of the massage roller of FIG. 10.

FIG. 13 depicts a top view of the massage roller 1000 of FIG. 10. The massage roller 1000 may have one or more moveable protuberances 1002 and one or more fixed protuberances 1004. In some embodiments, the one or more moveable protuberances 1002 may have a different color, texture, shape, and/or appearance to distinguish from the one or more fixed protuberances 1004.

Figures 14A, 14B, 14C:
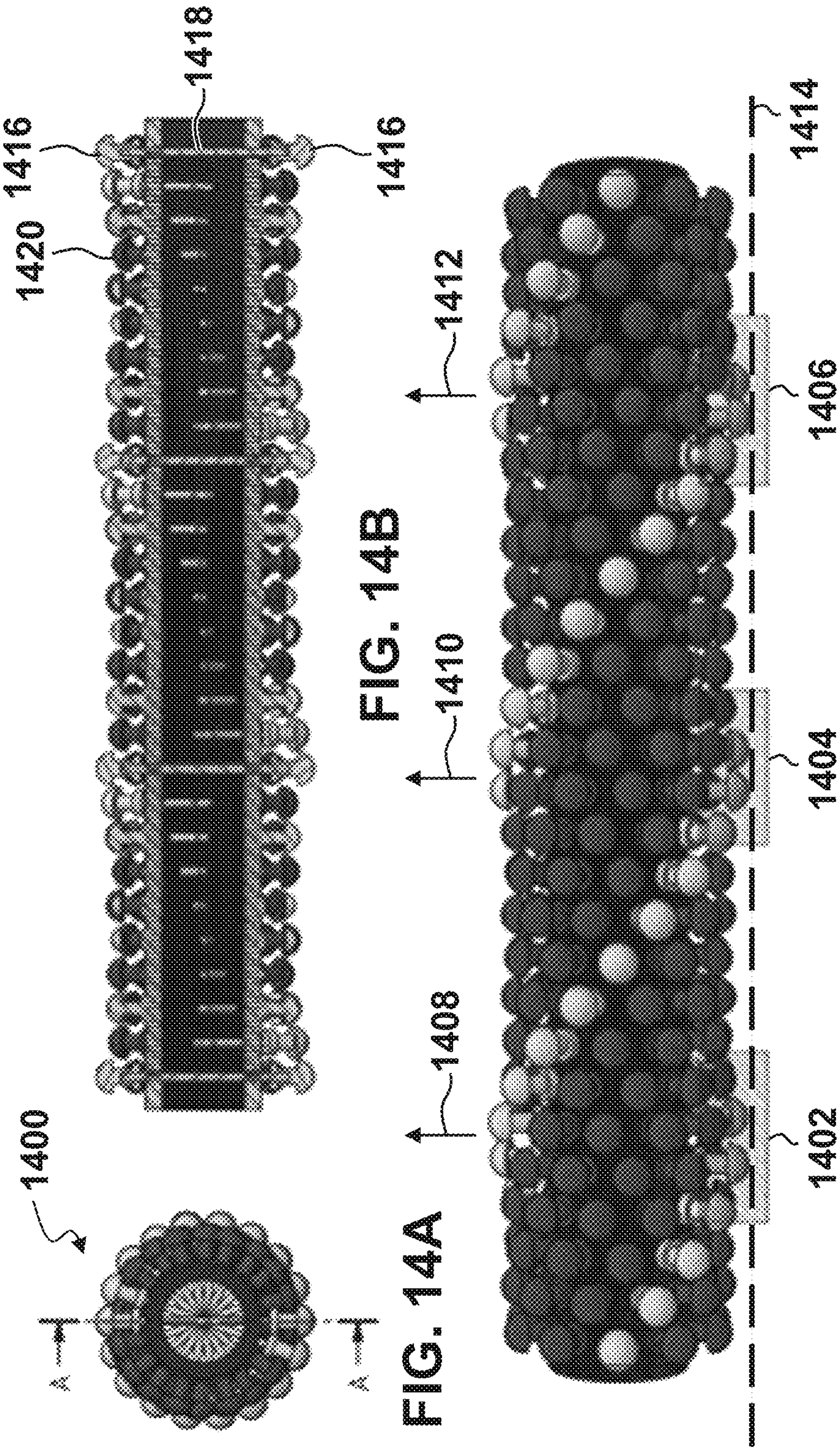
FIG. 14A depicts a side view of an alternate massage roller with moveable elements, according to an embodiment of the disclosure.
FIG. 14B depicts a cross-sectional view of the massage roller of FIG. 14A across line A-A.
FIG. 14C depicts a front view of the massage roller of FIG. 14A.

FIG. 14A depicts a side view of an alternate massage roller 1400 with moveable elements.

FIG. 14B depicts a cross-sectional view of the massage roller of FIG. 14A across line A-A. The massage roller may contain one or more moveable protuberances 1416 and one or more fixed protuberances 1420. Each arm 1418 may have a corresponding moveable protuberance 1416 disposed at each end.

FIG. 14C depicts a front view of the massage roller of FIG. 14A. In some embodiments, there may be at least two moveable protuberances in contact 1402, 1404, 1406 with a surface 1414 as the massage roller is rotated over the surface 1414. As the at least two moveable protuberances make contact 1402, 1404, 1406 with the surface 1414, corresponding moveable protuberances on the other end of the corresponding arms may be raised 1408, 1410, 1412 above the outer surface of the massage roller. Different moveable protuberances may be moved into first elevated and second sunken positions as the massage roller is rolled across a surface 1414 due to the pattern, such as a helix pattern, of the moveable protuberances on the massage roller. This allows a user to experience pressure at different points via rolling the massage roller.

Figure 15B:
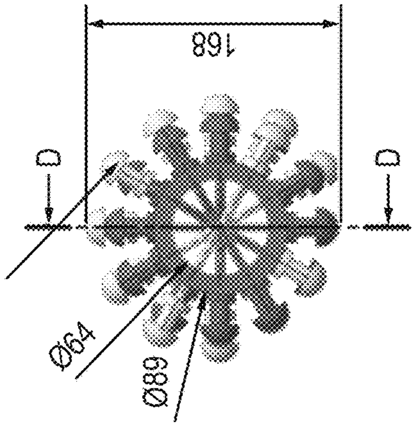
FIG. 15B depicts a side view of the massage roller of FIG. 15A.
Figure 15C:
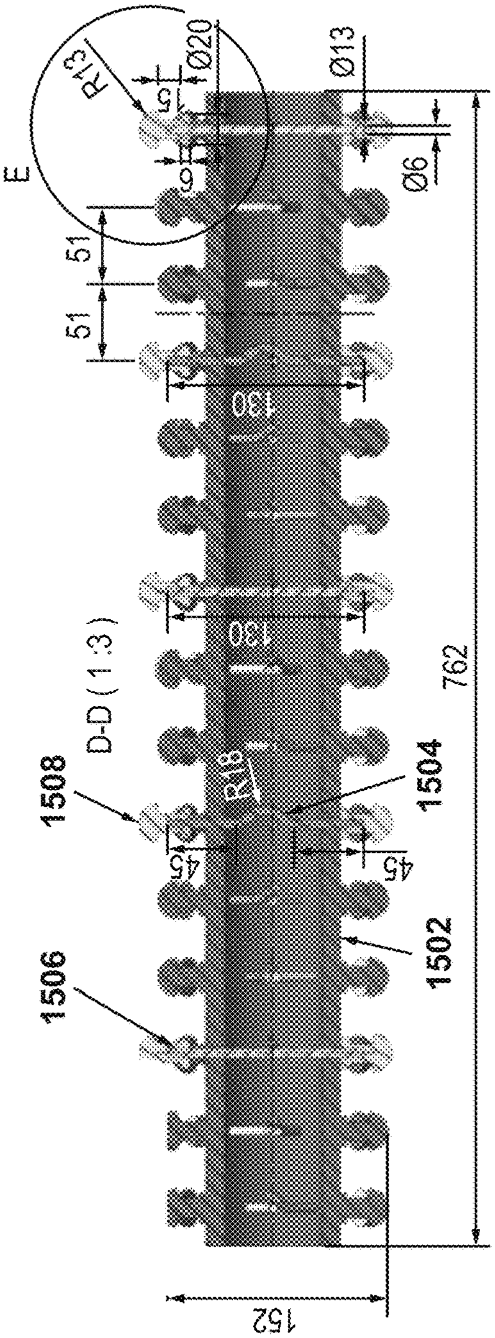
FIG. 15C depicts a cross-sectional view of the massage roller of FIG. 15B across line D-D.
Figure 15D:
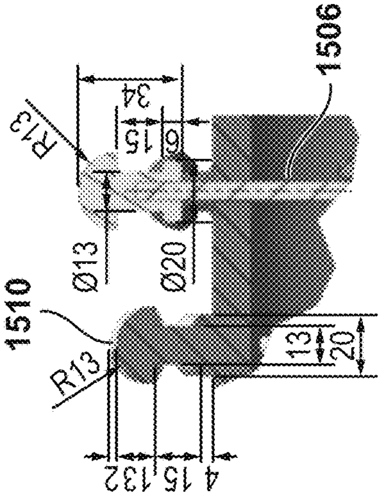
FIG. 15D depicts a close-up view of the massage roller of FIG. 15B about circle E.
Figure 15A:
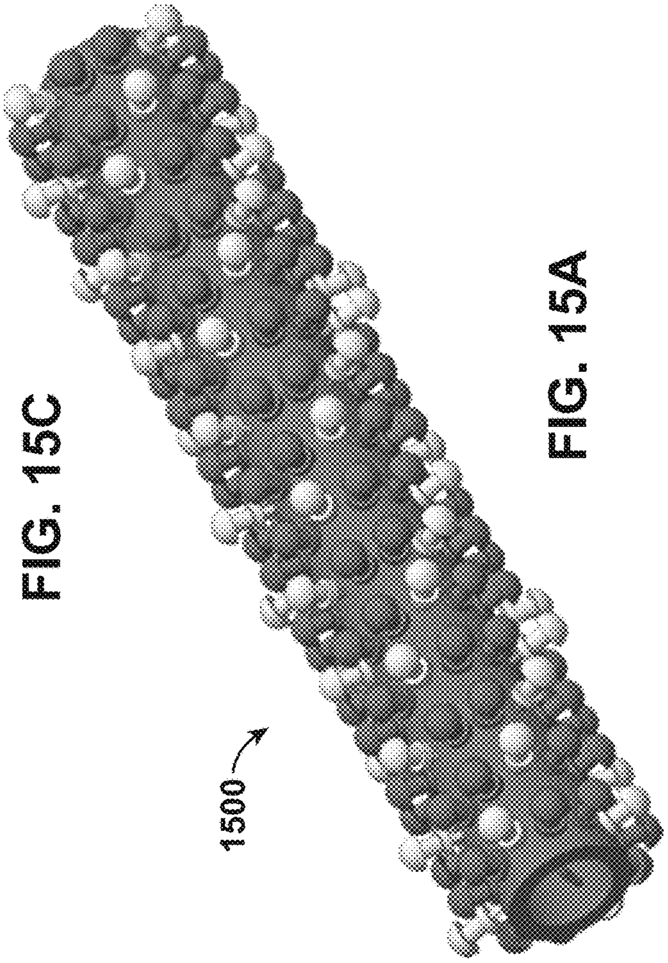
FIG. 15A depicts a perspective view of an alternate massage roller with moveable elements, according to an embodiment of the disclosure.

FIG. 15A depicts a perspective view of an alternate massage roller 1500 with moveable elements.

FIG. 15B depicts a side view of the massage roller of FIG. 15A.

FIG. 15C depicts a cross-sectional view of the massage roller of FIG. 15B across line D-D. The massage roller may include a roller body 1502, a first arm or pin 1506, a second arm or pin 1504, and one or more caps or moveable protuberances 1508. The first arm or pin 1506 may be substantially straight in design and contain a moveable protuberance or cap 1508 at each end. The second arm or pin 1504 may have a curved portion proximate a middle section. The second arm or pin 1504 may contain a moveable protuberance or cap 1508 at each end. The curved portion of the second arm or pin 1504 allows for the placement of moveable protuberances 1508 along a same 'row' of the massage roller without causing impingement of the first arm or pin 1506 with the second arm or pin 1504. Specifically, the curved portion of the second arm or pin 1504 moves about the first arm or pin 1506 without contacting the first arm or pin 1506 regardless of the position of the second arm or pin 1504, i.e., whether a first moveable protuberance 1508 is in an elevated position or a second moveable protuberance is in an elevated position with the first moveable protuberance and second moveable protuberance being connected to opposite ends of the second arm or pin 1504.

FIG. 15D depicts a close-up view of the massage roller of FIG. 15B about circle E. The massage roller may contain one or more arms or pins, such as first arm or pin 1506. The massage roller may also contain one or more fixed protuberances 1510.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:

a massage roller;

one or more arms at least partially disposed within the massage roller, wherein each arm of the one or more arms has a length greater than the diameter of the massage roller and slides freely across the diameter of the massage roller; and two or more movable protuberances, wherein each of the two or more movable protuberances is disposed at each end of each arm.

2. The system of claim 1, wherein each movable protuberance is sized to prevent a corresponding arm from completely exiting the massage roller.

3. The system of claim 1, wherein the system further comprises:

one or more static protuberances disposed on the exterior of the massage roller.

4. The system of claim 3, wherein each arm has a fixed length.

5. The system of claim 4, wherein each arm is made of a rigid material.

6. The system of claim 1, wherein the massage roller has a solid core.

7. The system of claim 1, wherein at least one of the two or more movable protuberances has defined sides.

8. The system of claim 1, wherein at least one of the two or more movable protuberances has a dome shape.

9. The system of claim 1, further comprising:

a vibration mechanism configured to vibrate the two or more moveable protuberances.

10. The system of claim 1, wherein at least a subset of the two or more movable protuberances is configured to be in alternating positions.

11. The system of claim 1, wherein at least a subset of the two or more movable protuberances is configured to move simultaneously.

12. A system comprising:

a massage roller;

one or more static protuberances disposed on an outer surface of the massage roller;

one or more arms at least partially disposed within the massage roller; and one or more movable protuberances, wherein each of the one or more movable protuberances is disposed at an end of each arm of the one or more arms; and a resilient element configured to extend the one or more moveable protuberances to a first elevated position;

wherein each of the one or more moveable protuberances is moveable between the first elevated position elevated above the outer surface of the massage roller and a second sunken position substantially level with one or more static protuberances.

13. The system of claim 12, wherein the massage roller has a solid core.

14. The system of claim 12, further comprising:

a vibration mechanism configured to vibrate the one or more moveable protuberances.

15. The system of claim 12, wherein at least a subset of the one or more movable protuberances is configured to be in alternating positions.

16. The system of claim 12, wherein at least a subset of the one or more movable protuberances is configured to move simultaneously.

17. The system of claim 12, wherein each arm of the one or more arms is a piston, and wherein each arm further comprises:

a first piston member; and a second piston member configured to receive the first piston member.

18. A method comprising:

providing a massage roller with one or more moveable protuberances connected to one or more corresponding moveable arms and one or more static protuberances;

rolling on top of the massage roller;

extending a moveable protuberance of the one or more moveable protuberances above an outer surface of the massage roller to an elevated position; and retracting the moveable protuberance to a second sunken position as pressure is applied to the moveable protuberance.

19. The method of claim 18, further comprising:

extending the moveable protuberance to the elevated position as pressure is removed from the moveable protuberance.

* * * * *